United States Patent [19]
Kobayashi

[11] Patent Number: 4,909,096
[45] Date of Patent: Mar. 20, 1990

[54] AUTOMATIC TRANSMISSION SHIFT CONTROL DEVICE

[75] Inventor: Satoshi Kobayashi, Fujisawa, Japan

[73] Assignee: Nissan Motor Co., Ltd., Yokohama, Japan

[21] Appl. No.: 368,175

[22] Filed: Jun. 20, 1989

[30] Foreign Application Priority Data

Jun. 21, 1988 [JP] Japan ................................ 63-153783

[51] Int. Cl.$^4$ ........................... G05G 1/00; G05G 5/06
[52] U.S. Cl. ......................................... 74/538; 74/503;
74/543; 74/536; 74/878; 192/4 A; 192/1.1;
192/30 W
[58] Field of Search ................. 74/503, 548, 538, 536,
74/529, 540, 543, 560, 527, 475, 479, 878 X;
192/4 A X, 30 W

[56] References Cited

U.S. PATENT DOCUMENTS

| | | | |
|---|---|---|---|
| 4,078,447 | 3/1978 | Kato et al. ............................. | 74/475 |
| 4,128,151 | 12/1978 | Grosseau ............................. | 192/4 A |
| 4,365,522 | 12/1982 | Kubota et al. ..................... | 74/527 X |
| 4,371,063 | 2/1983 | Troemner et al. ................. | 192/4 A |
| 4,473,141 | 9/1984 | Mochida ........................ | 192/4 A X |
| 4,474,085 | 10/1984 | De Vogelaere et al. ............. | 74/878 |
| 4,562,906 | 1/1986 | Barbagli ............................. | 192/4 A |
| 4,603,600 | 8/1986 | Yamazaki ............................. | 74/503 |
| 4,643,043 | 2/1987 | Furuta et al. ......................... | 74/503 |
| 4,747,278 | 5/1988 | Roncelli et al. ................... | 74/538 X |
| 4,774,850 | 10/1988 | Shovin ............................. | 74/538 X |

FOREIGN PATENT DOCUMENTS

| | | | |
|---|---|---|---|
| 0172024 | 9/1984 | Japan ..................................... | 74/538 |
| 60-185750 | 12/1985 | Japan . | |
| 373649 | 1/1964 | Switzerland ........................... | 74/538 |

Primary Examiner—Vinh T. Luong
Attorney, Agent, or Firm—Foley & Lardner, Schwartz, Jeffery, Schwaab, Mack, Blumenthal & Evans

[57] ABSTRACT

An automatic transmission shift control device is provided with a control unit for automatically putting a selector lever in a locked condition when the selector lever is in its parking position and unless a brake pedal is fully depressed, and a manual actuating unit for manually actuating said control unit and releasing same from the locked condition.

5 Claims, 5 Drawing Sheets

AUTOMATIC TRANSMISSION SHIFT CONTROL DEVICE

BACKGROUND OF THE INVENTION

1. Field of the Invention

The present invention relates in general to automatic transmissions and more particularly to an automatic transmission shift control device of the kind in which when the ignition key is in the "ON" position, shifting of gears from "P(parking)" to other gears cannot be attained unless the brake pedal is fully depressed.

2. Description of the Prior Art

An example of an automatic transmission shift control device of the above described kind is shown in Japanese Utility Model Provisional Publication No. 60-185750.

A problem of the prior art shift control device is that the solenoid pin of the solenoid is liable to be deformed to cause malfunction of the shift control device since, if the selector lever in a locked condition is subjected to an operating force for shifting gears, the solenoid pin receives the operating force to resist movement of the selector lever. This problem can be solved by increasing the strength of the solenoid pin so that the solenoid pin is not deformed by such an operating force. However, this causes another problem that the solenoid becomes large-sized to increase the manufacturing cost, weight and design and layout restrictions.

Another problem is that upon malfunction of the shift control device the selector lever may possibly be held in a locked condition and cannot be released from same. This is undesirable, particularly from the passenger's safety point of view since the vehicle becomes immovable only due to the malfunction of the shift contol device.

SUMMARY OF THE INVENTION

In accordance with the present invention, there is provided an improved automatic transmission shift control device for a vehicle having a brake pedal.

The shift control device comprises a selector lever movable into a plurality of gear positions including a parking position and having a hollow cylindrical post having a pair of diametrically opposed openings and a knob attached to the upper end of the post, control means for controlling movement of the selector lever, including a position plate having a profiled opening defining the gear positions, a position pin installed transversely of the post in the openings for up-and-down movement and releasably engaged in the position plate for positioning the selector lever at one of the gear positions, a reciprocative rod installed in the post for up-and-down movement and supporting the position pin at the lower end thereof, a control button mounted in the knob for substantially horizontal movement and cooperative with the reciprocative rod to disengage the position pin from the position plate, a bushing mounted on the post for rotation but against axial movement and having diametrically opposed openings into which the position pin is moved for disengagement from the position plate, a solenoid operatively connected to the bushing to apply same a driving force for driving the bushing selectively between a first position where the openings of the bushing are aligned with the position pin and a second position where the openings of the bushing are misaligned with the position pin, and an electrical circuit for controlling the solenoid in such a way that the bushing is rotated into the first position when the position pin is in the parking position and the brake pedal is fully depressed and into the second position when the position pin is in the parking position and the brake pedal is free from depression; and manual actuating means for prevailing against the driving force of the solenoid and manually rotating the bushing into the first position.

The above structure is effective for solving the above noted problem inherent in the prior art device.

It is accordingly an object of the present invention to provide an improved automatic transmission shift control device which can effectively prevent its constituent part or parts from being damaged without increasing the strength of each constituent part of itself.

It is another object of the present invention to provide an improved automatic transmission shift control device which makes it assured that the transmission is operable even upon malfunction of the shift control device.

It is a further object of the present invention to provide an improved automatic transmission shift control device which is desirable, particularly from the passenger's safety point of view.

DESCRIPTION OF THE PREFERRED EMBODIMENTS

Figure 1:
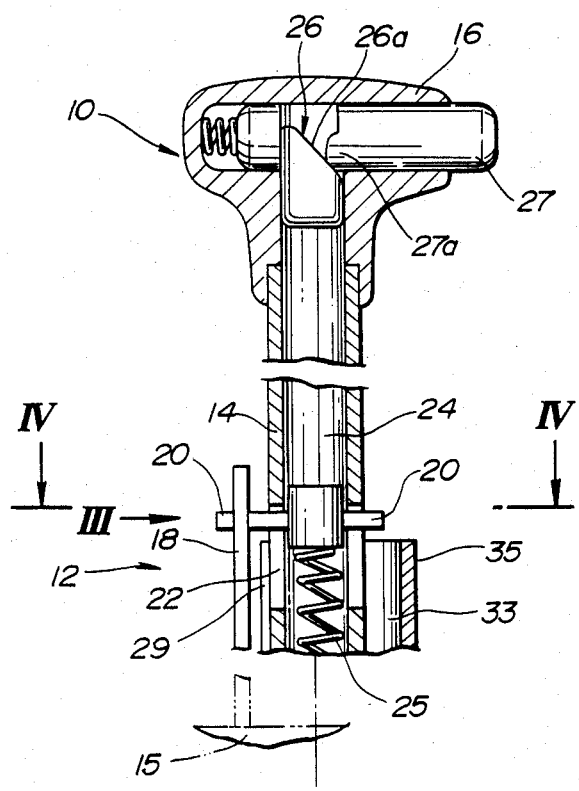
FIG. 1 is a sectional view of a principal portion of an automatic transmission shift control device according to an embodiment of the present invention.
Figure 2:
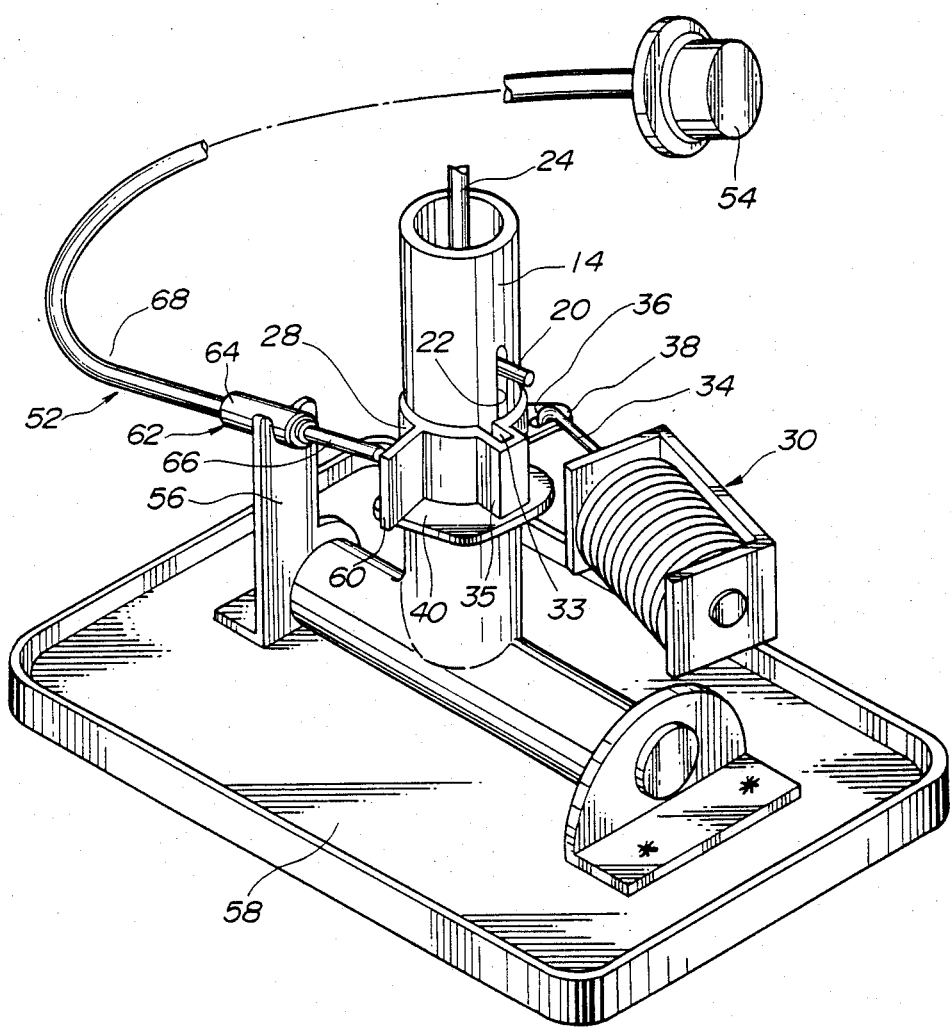
FIG. 2 is a perspective view of the automatic transmission shift control device of FIG. 1.

Referring to FIGS. 1 to 5, an automatic transmission shift control device according to an embodiment of the present invention is shown as comprising a selector lever 10 and a selector lever shift position control unit 12 for controlling the movement of the selector lever 10.

The selector lever 10 is swingable into various gear positions including a "P" position for shifting gears of an associated automatic transmission (not shown). The selector lever 10 consists of a hollow cylindrical post 14 pivotally mounted at the lower end on a vehicle body 15 and a knob 16 attached to the upper end of the post 14.

Figure 3:
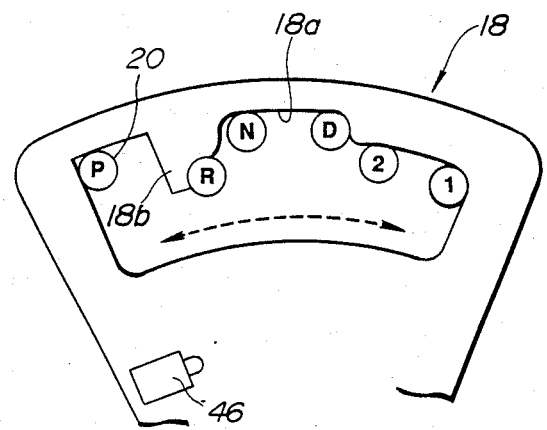
FIG. 3 is a view taken in the direction of the arrow III of FIG. 1.

The selector lever shift position control unit 12 includes a position plate 18 which is stationary, i.e., fixedly attached to the vehicle body 15. As shown in FIG. 3, the position plate 18 is formed with a profiled opening 18a for locating the selector lever 10 in various gear positions including a "P" position. A position pin 20 is engaged in the profiled opening 18a of the position plate 18 for positioning the selector lever 10 in one of the gear positions. The post 14 is formed with a pair of diametrically opposed openings 22 and 22 for receiving therein the position pin 20. The openings 22 and 22 are elongated axially of the post 14 for allowing up-and-down movement of the position pin 20 relative to the post 14 and the position plate 18. The position pin 20 extends across or transversely of the post 14 and have opposite ends projecting outwardly from the openings 22 and 22. A reciprocative rod 24 is installed in the post 14 for up-and-down movement and attached to the position pin 20 at the lower end by way of a slider 25. A slide cam 26 having a tapered cam face 26a is installed in the knob 16 and attached to the upper end of the rod 24 for up-and-down movement with same. A coil spring 25 is installed in the post 14 to urge the rod 24 and the slide cam 26 upwardly together with the position pin 20. A control button 27 is installed in the knob 16 for substantially horizontal movement and has an inner end portion 27a engaged with the tapered cam surface 26a so that pushing the control button 27 inwardly of the knob 16 or allowing the former to project outwardly from the latter causes downward movement or upward movement of the slide cam 26 and the rod 24. A bushing 28 in the form of a generally part-circular band or a split ring is concentrically mounted on the post 14 for rotation but against axial movement. The bushing 28 has an opening 29 between the opposite circumferential ends 31, 31 and another opening 33 defined by a channel-shaped circumferential wall portion 35 in such a way as to extend throughout the axial length of the bushing 28 and to diametrically oppose to the opening 29. The position pin 20 moves upwardly and downwardly in the openings 29 and 33 during movement of the selector lever 10 from the "P" position into other gear positions as the "R (reverse)" position, "N (neutral)" position, "D (drive)" position, "1 (first gear)" position and the "2 (second gear)" position. In other words, in order to shift the selector lever 10 from the "P" position to other gear positions, it is necessary to place the position pin 20 in the lower end portions of the openings 22 and 22. To attain this, it is inevitable that the position pin 20 is moved into the openings 29 and 33.

Figure 4:
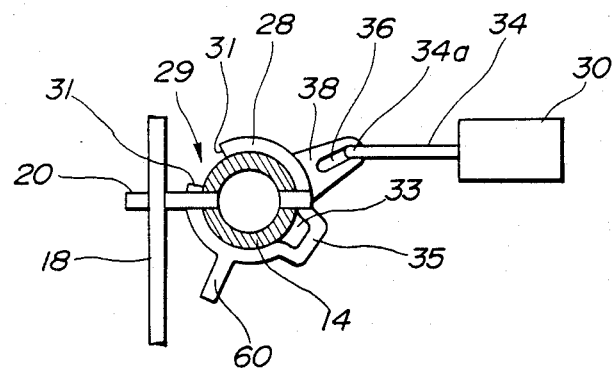
FIG. 4 is a sectional view taken along the line IV—IV of FIG. 1.

A solenoid 30 is connected to the bushing 28 for rotating the same in such a way that when the position pin 20 is in the "P" position the bushing 28 is rotated into a position where the openings 29 and 33 are misaligned with the position pin 20 as shown in FIG. 4 and that even when the position pin 20 is in the "P" position the bushing 28 can be moved into a position where the openings 29 and 33 are aligned with the position pin 20 by fully depressing a brake pedal 41 and thereby causing a stop switch 32 (see FIG. 5) to be turned "ON" to energize the solenoid 30. Indicated by the reference numeral 34 is a solenoid pin projectable from and retractable into the solenoid 30 and has an end 34a engaged in a slot 36 formed in an outer peripheral projection 38 of the bushing 28. Indicated by the reference numeral 40 is a bushing support 40 secured to the post 14 for supporting thereon the bushing 28.

Figure 5:
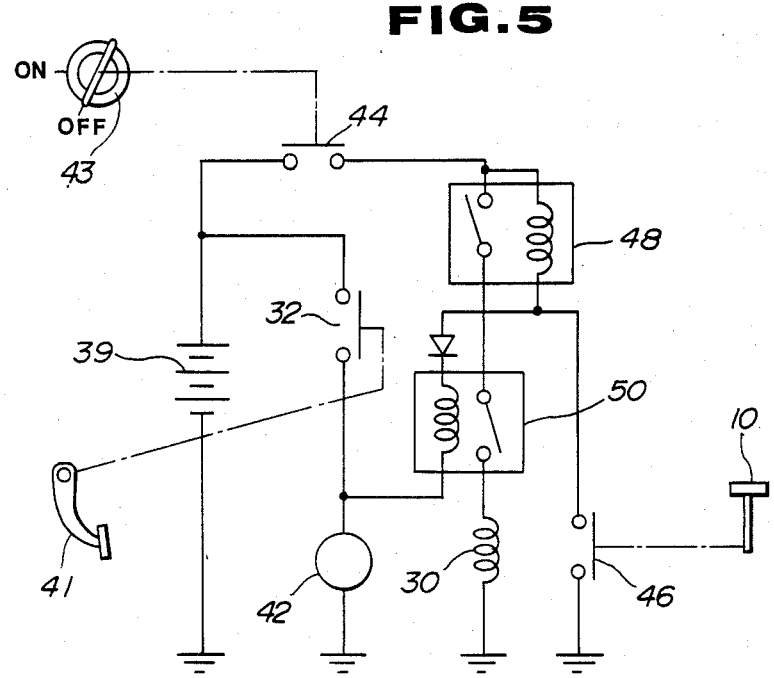
FIG. 5 is a wiring diagram of an electric circuit for controlling the operation of a solenoid employed in the automatic transmission shift control device of FIG. 1.

The rotation of the bushing 28 is controlled by an electric circuit shown in FIG. 5. The electric circuit includes the aforementioned stop switch 32 which is closed when the brake pedal 41 is fully depressed and opened when released from the depression. The stop switch 32 is connected in series with a d.c. source 39 and a stop lamp 42. An ignition key position detecting switch 44 is closed when an ignition key 43 is in the "ON" position and closed when in the "OFF" position. A selector lever position detecting switch 46 is closed when the selector lever 10 is in the "P" position and opened when out of the "P" position. The switch 46 is connected in series with the ignition switch 44 which is disposed between the d.c. source 39 and the switch 46. The stop switch 32 is in parallel relation with the switches 44 and 46. A first relay 48 is disposed between the switches 44 and 46 and connected in series with same. The solenoid 30 is connected in series with the switch 44 and the first relay 48 and in parallel with the switches 32 and 46. A second relay 50 is disposed between the first relay 48 and the solenoid 30.

With the foregoing structure, when the ignition switch 43 is in the "ON" position, shifting of the selector lever 10 from the "P" position to other gear positions is prevented unless the brake pedal 41 is fully depressed. In this instance, the ignition key position detecting switch 44 and the selector lever position detecting switch 46 are closed thus allowing the relays 48 and 50 to be closed. The solenoid 30 is energized to allow the solenoid pin 34 to project outwardly therefrom. By this, the bushing 28 is rotated into a position where the openings 29 and 33 are misaligned with the position pin 20. In order to shift the selector lever 10 from the "P" position to other gear positions as "R", "N", "D", "2", and "1", it is necessary to push the control button 27 into the knob 16 for thereby moving the position pin 20 downwardly into the lower end portions of the openings 22 and 22 so that the position pin 20 can clear or go over a stopper portion 18b of the profiled opening 18a of the position plate 18. However, the downward movement of the position pin 20 in response to the movement of the control button 27 inwardly of the knob 16 is prevented by the bushing 28, i.e., the control button 27 cannot move into the knob 16 sufficiently or a predetermined amount since the openings 29 and 33 are misaligned with the position pin 20 to make the position pin 20 abut upon the upper axial end of the bushing 28.

In accordance with the present invention, the automatic transmission shift control device further comprises a manual actuating unit 52 which is operative to prevail against the driving force by the solenoid 30 and manually rotate the bushing 28 into the position where the bushing 28 is aligned with the openings 29 and 33. The manual actuating unit 52 consists of a push button 54 installed on an instrument panel (not shown) or the like section of the vehicle body 15, a bracket 56 installed on a base plate 58 which is in turn stationarily held on the vehicle body 15 and on which the position plate 18 is also installed, a driven flange 60 in the form of a radial projection integral with the bushing 28, a driving rod assembly 62 including a casing 64 fixed to the bracket 56 and a driving rod 66 axially movably installed in the casing 64 and contactable at an outward end with the driven flange 60, and a control cable 68 interconnecting the push button 54 and the driving rod 66 such that a predetermined amount of manual depression of the push button 54 prevails against the driving force by the solenoid 30 and causes the driving rod 66 to push the driven flange 60 and thereby rotate the bushing 28 into the position where the openings 29 and 33 of the bushing 28 are aligned with the position pin 20 and that the driving rod 66 is held out of contact with the driven flange 60 when the push button 54 is free from the depression.

With the manual actuating unit 52, in case where the solenod 30 malfuctions due to its damage or the like, the push button 54 on the instrument panel or the like vehicle body section is pushed to prevail against the driving force of the solenoid 30 and rotate, by way of the control cable 68, driving rod 66 and driven flange 60, the bushing 28 into the position where the position pin 20 is aligned with the openings 29 and 33 such that the position pin 20 is movable into the lower end portions of the openings 22 and 22, i.e., the position pin 20 is released from the locked condition to allow the selector lever 10 to be shiftable from the "P" position to other gear positions.

In the above, it will be understood that the force received by the position pin 20 during the above prevention of gear shifting is sufficiently small since the position pin 20 receives only the force which is transferred from the control button 27 through the slide cam 26. The force applied to the control button 27 is not so large. Further, the force received by the position pin 20 is smaller than the force applied to the control button 27 since it is reduced during transmission from the control button 27 to the slide cam 26 by the effect of the tapered cam surface 26a.

In order to shift the selector lever 10 form the "P" position to other gear positions, the brake pedal 41 is fully depressed. In response to full depression of the brake pedal 41, the stop switch 32 is closed, thus allowing the solenoid 30 to be de-energized since there is no current through the relay 50. The solenoid pin 34 thus retracts into the solenoid 30, rotating the bushing 28 into the position where the openings 29 and 33 are aligned with the position pin 20. Pushing the control button 27 into the knob 16 causes the position pin 20 to move into the lower end portions of the openings 22, 22, whereby to make it possible for the position pin 20 to clear or go over the stopper portion 18b of the profiled opening 18a of the position plate 18. The selector lever 10 therefore can be moved from the "P" position to other gear positions.

It will be further understood that upon malfunction of the selector lever shift position control unit 12 the selector lever 10 can be assuredly released from the locked condition by the manual actuating unit 52, whereby it is assured that the transmission is operable even upon malfunction of the selector lever shift position control unit 12.

Figure 6:
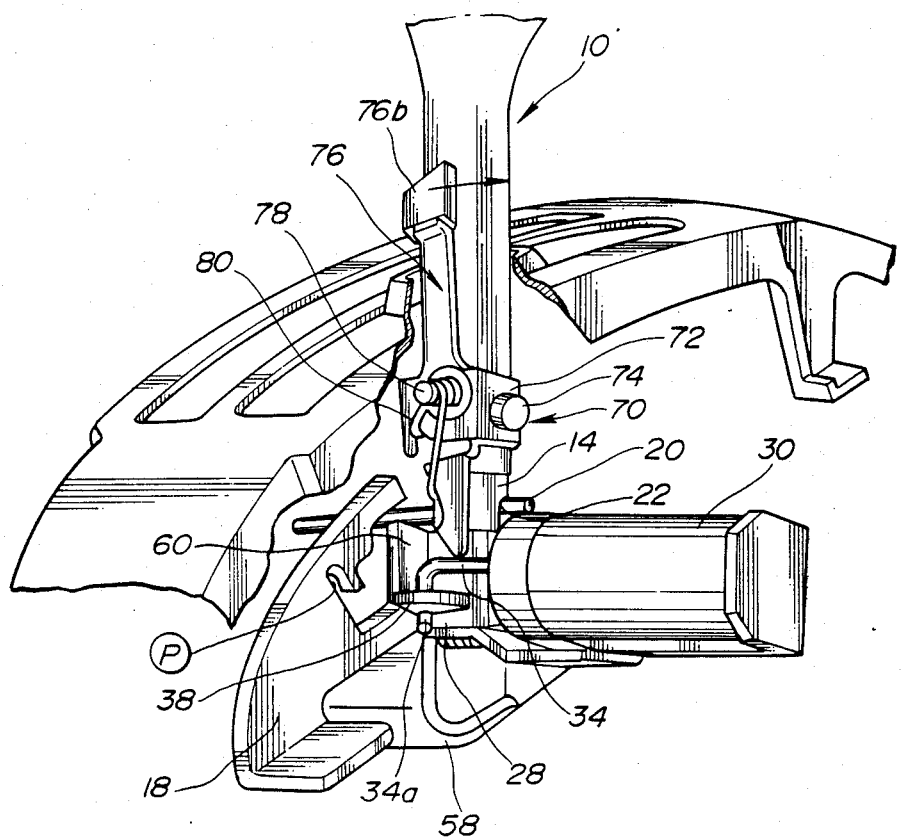

FIG. 6 shows another embodiment in which like parts and portions similar to those of the previous embodiment are designated by the same reference characters. This embodiment differs from the previous embodiment in that the manual actuating unit 70 includes a channel-shaped bracket 72 secured to the post 14 with a screw 74 and a release lever 76 installed at an axially intermediate portion on the bracket 72 in such a way as to be turnable or swingable about a pin 78 secured to the bracket 72. The release lever 76 has a lower end portion 76a for contact with the driven flange 60 and an upper end portion 76b serving as a knob. The manual actuating unit 70 further includes a spring 80 engaged at the opposite ends with the release lever 76 and the bracket 72 so as to urge the release lever 76 to swing in the direction of causing the lower end 76a to be out of contact with the driven arm 60.

With the above structure, if the solenoid 30 malfunctions due to its damage or the like, the upper end portion 76b of the release lever 76 is moved a predetermined amount against the bias of the spring 80 in the direction of the arrow in the drawing, whereby to allow the lower end portion 76a of the release lever 76 to contact the driven flange 60 to prevail against the driving force of the solenoid 30 and push the driven flange 60 for thereby rotating the bushing 28 into the position where the position pin 20 is aligned with the openings 29 and 33, i.e., the position pin 20 is released from the locked condition to allow the selector lever 10 to be shiftable from the "P" position into other gear positions. Except for the above, this embodiment is substantially similar to the previous embodiment and can produce the same effects.

Figure 7:
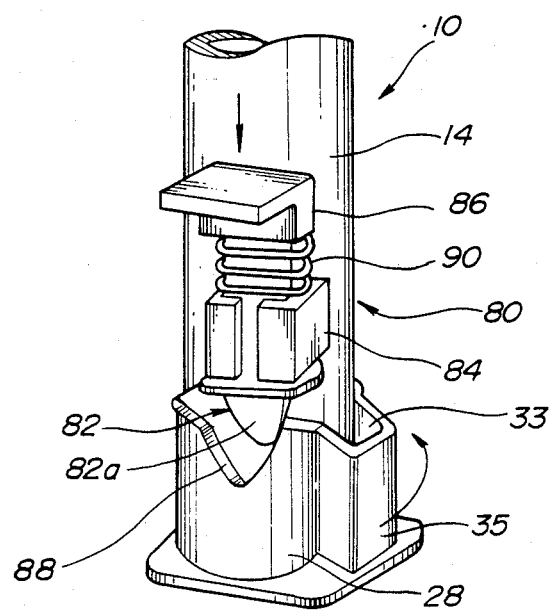
FIGS. 6 and 7 are perspective views of further embodiments of the present invention.

FIG. 7 shows a further embodiment in which like parts and portions to those of the previous embodiment of FIGS. 1–5 are designated by the same reference characters, though some parts are omitted for brevity. This embodiment differs from the previous embodiment of FIGS. 1–5 in that the manual actuating unit 80 includes a reciprocative release lever 82 installed on the post 14 by means of a guide member 84 in such a way as to be movable or reciprocative vertically. The release lever 82 has at an upper end an actuating knob 86 of an L-like configuration and a v-shaped or wedge-shaped lower end 82a constituting a driving cam and engageable in a correspondingly wedge-shaped groove 88 formed in the bushing 28 and constituting a driven cam. The manual actuating unit 80 further includes a spring 90 interposed between the knob 86 and the guide member 84 for urging the lever 82 upwardly, i.e., in the direction of causing the wedged-shaped lower end 82a to move away from the groove 88 to hold the wedge-shaped lower end 82a out of contact with the bushing 28.

With the above structure, in case where the solenoid 30 malfunctions due to its damage or the like, the knob 86 of the lever 82 is pushed a predetermined distance downwardly as indicated by the arrow in the drawing to engage the wedge-shaped lower end 82a of the lever 82 in the correspondingly wedge-shaped groove 88 of the bushing 28 and thereby rotate the bushing 28 into the position where the position pin 20 is aligned with the openings 29 and 33 of the bushing 28, i.e., the position pin 20 is released from the locked condition to allow the selector lever 10 to be shiftable from the "P" position into other gear positions. Except for the above, this embodiment is substantially similar to the previous embodiments and can produce substantially the same effect.

What is claimed is:

1. An automatic transmission shift control device for a vehicle having a brake pedal, comprising:
   a selector lever movable into a plurality of gear positions including a parking position and having a hollow cylindrical post having a pair of diametrically opposed openings and a knob attached to an upper end of said post;
   control means for controlling movement of said selector lever, including a position plate having a profiled opening defining said gear positions, a position pin installed transversely of said post in said openings for up-and-down movement and releasably engaged in said position plate for positioning said selector lever at one of said gear positions, a reciprocative rod installed in said post for up-and-down movement and installing said position pin at the lower end thereof, a control button mounted in said knob for substantially horizontal movement and cooperative with said reciprocative rod to disengage said position pin from said position plate, a bushing mounted on said post for rotation but against axial movement and having diametrically opposed openings into which said position pin is moved for disengagement from said position plate, a solenoid operatively connected to said bushing to apply same a driving force for driving said bushing selectively between a first position where said openings of said bushing are aligned with said position pin and a second position where said openings of said bushing are misaligned with said position pin, and an electrical circuit for controlling said solenoid in such a way that said bushing is rotated into said first position when said position pin is in said parking position and the brake pedal is fully depressed and into said second position when said position pin is in said parking position and the brake pedal is free from depression; and manual actuating means for prevailing against the driving force of said solenoid and manually rotating said bushing into said first position.

2. The automatic transmission shift control device as set forth in claim 1 wherein said manual actuating means comprises a push button, a stationary bracket, a push rod assembly having a casing fixed to said bracket and a driving rod movably installed in said casing, a driven flange integral with said bushing and contactable with an end of said driving rod, and a control cable interconnecting said push button and the other end of said driving rod in such a manner that a predetermined amount of depression of said push button causes said driving rod to push said driven flange and thereby rotate said bushing into said first position while prevailing against the driving force of said solenoid.

3. The automatic transmission shift control device as set forth in claim 1 wherein said manual actuating means comprises a driven flange integral with said bushing, a bracket installed on said post, a release lever swingably installed at its intermediate portion on said bracket and having an upper end portion serving as a knob and a lower end portion contactable with said driven flange such that a predetermined amount of movement of said upper end portion in a predetermined direction causes said lower end portion to prevail against the driving force of said solenoid and push said driven flange for thereby rotating said bushing into said first position, and a spring interposed between said release lever and said bracket for urging said release lever into a predetermined position where said lower end portion of said release lever is out of contact with said driven flange.

4. The automatic transmission shift control device as set forth in claim 1 wherein said manual actuating means comprises a guide member installed on said post, a release lever vertically movably installed in said guide member and having a wedge-shaped lower end portion serving as a driving cam, a wedge-shaped groove formed in said bushing and serving as a driven cam such that a predetermined amount of downward movement of said release lever causes said wedge-shaped lower end portion to cooperate with said wedge-shaped groove to rotate said bushing into said first position while prevailing against the driving force of said solenoid, and a spring interposed between said release lever and said guide member for urging said release lever into a position where said wedge-shaped lower end portion is out of contact with said bushing.

5. The automatic transmission shift control device as set forth in claim 1 wherein said bushing is in the form of a part-circular band and has a channel-shaped circumferential wall portion for defining therein one of said openings of said bushing, the other of said openings of said bushing being defined between opposed circumferential ends of said bushing.

* * * * *